E. K. H. LUNDBERG.
SELF CLOSING AND SHOCK PREVENTING VALVE.
APPLICATION FILED JAN. 22, 1920.
1,431,406.
Patented Oct. 10, 1922.
2 SHEETS—SHEET 1.
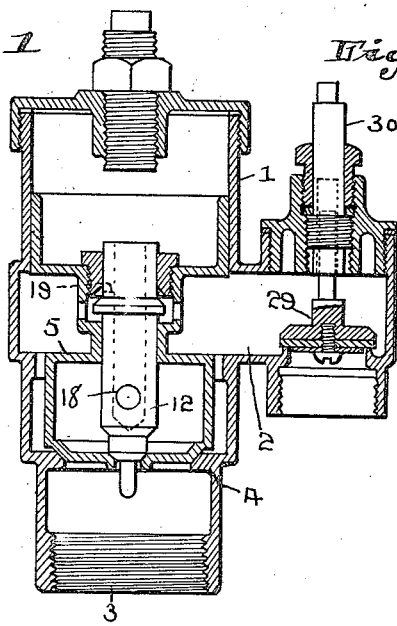
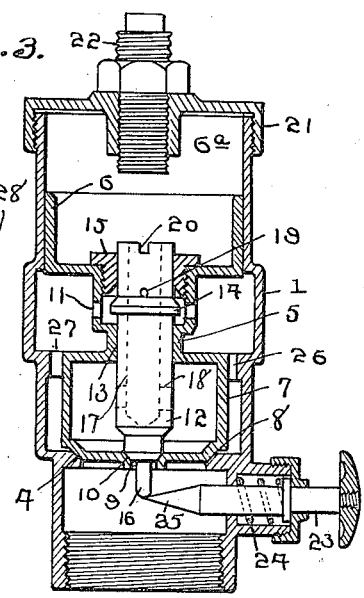
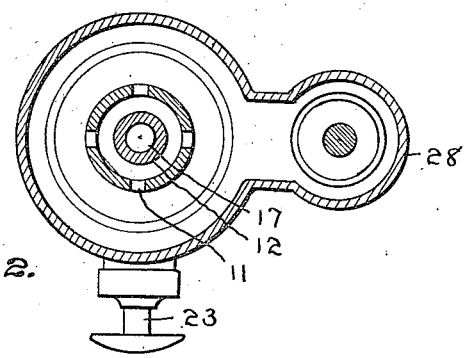
Inventor
E.K.H.Lundberg.
By H. R. Kerslake
Attorney

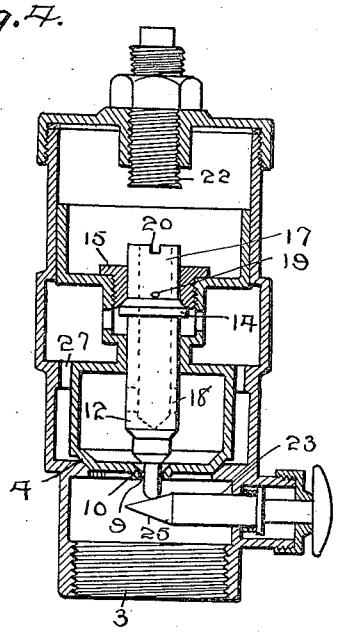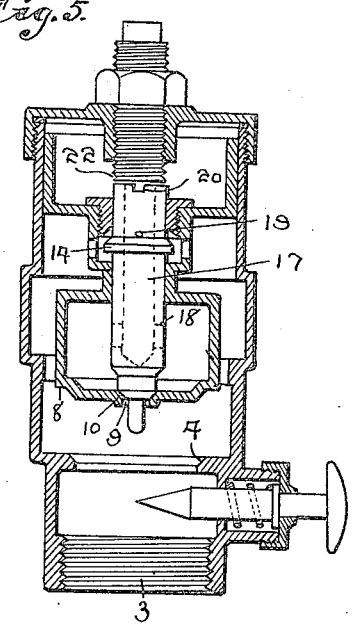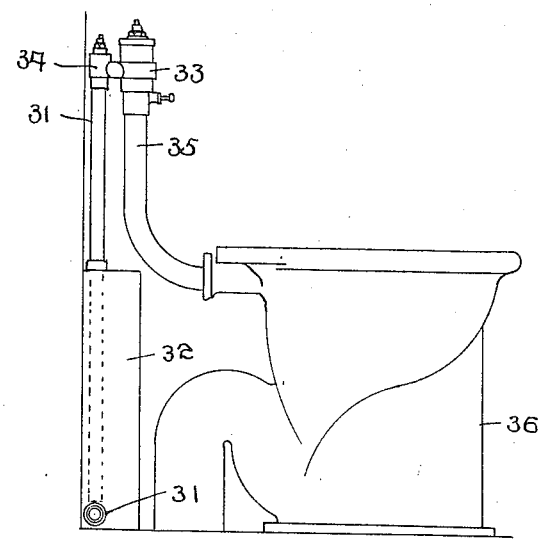

Patented Oct. 10, 1922.

1,431,406

UNITED STATES PATENT OFFICE.

ELOF KARL HJALMAR LUNDBERG, OF SALTSJOBADEN, SWEDEN.

SELF-CLOSING AND SHOCK-PREVENTING VALVE.

Application filed January 22, 1920. Serial No. 353,304.

*To all whom it may concern:*

Be it known that I, ELOF KARL HJALMAR LUNDBERG, a subject of the King of Sweden, and resident of Villa Sjotorp, Saltsjobaden, in the Kingdom of Sweden, have invented certain new and useful Improvements in Self-Closing and Shock-Preventing Valves, of which the following is a specification, reference being made to the accompanying drawings.

The present invention relates to a self-closing and shock-preventing valve which can be arranged for letting through a predetermined quantity of water (or other liquid), independently of any alteration of the pressure in the conduit leading to the valve. The valve is especially intended to replace the flushing cisterns, with appertaining valve, now in use.

The invention is characterized chiefly by a differential piston displaceable in the valve box and a valve spindle movable in the said piston, by the cooperation of which two parts the valve, after outside action on the valve spindle, acts in the required manner for letting through a predetermined quantity of water or the like.

On the accompanying drawings is shown, by way of example, a valve, with appertaining by-pass valve, constructed in conformity with the present invention. Fig. 1 shows a section along the line A—B in Fig. 2, which latter shows a section along the line C—D in Fig. 1. Fig. 3 shows a section along the line E—F in Fig. 1. Figs. 4 and 5 show sections of the main valve corresponding to the section in Fig. 3, at other positions of its parts than in the last-mentioned figure. Fig. 6 shows a valve serving as a flushing valve for a water closet, and provided with an air pressure bell in its supply pipe.

The valve box 1 of the main valve is provided with an inlet 2, an outlet 3 and a valve seat 4. In the valve box there is a differential piston 5, the upper part 6 of which, which part has a larger diameter, moves tightly in the valve box. The said part serves as the bottom limit of a space or chamber 6ª in the valve box, the "variable pressure chamber", so-called because the variations of pressure in this chamber determine the displacement of the differential piston in one direction or the other.

The lower, hollow part 7 of the differential piston, which part has a smaller diameter than the upper part, is made so as to fit tightly against the valve seat 4, and it is provided both with a shoulder forming an annular surface 8 with a larger diameter than the valve seat 4, and also with a valve opening 9 and an appertaining valve seat 10. Between the parts 6 and 7 there are arranged in the differential piston apertures 11. A valve spindle 12 moves tightly in an opening 13 in the differential piston, and is provided with an annular projection 14, which fits tightly against a sleeve 15, tightly screwed into the differential piston. The lower part of the valve spindle fits tightly against the seat 10, and a downward extension 16 thereof projects down through the valve opening 9. In the valve spindle 12 is arranged a channel 17, from which proceed holes 18 and 19, and in its upper end there is a groove 20.

A cover 21 tightly closes the upper part of the valve box, and in the said cover an adjusting screw 22 is screwed.

A pressure spindle 23 runs in a sleeve on the valve box. The said spindle, when it has been pressed inwards, is restored to its original position by a spring 24. The tip of the inner, conical end 25 of the spindle 23 is situated immediately under the extension 16 of the valve spindle.

The valve box 1 is provided with an annular shoulder 26, which determines the size of the annular space 27 between the valve box and the lower part of the differential piston.

An adjustment or by-pass valve 28, which is arranged between the above described main valve and the supply pipe of the same, is provided with a valve disc 29 and an adjustment spindle 30.

In Fig. 6 31 designates a supply pipe, 32 an air pressure bell, 33 the valve serving as flushing valve with its by-pass valve 34, 35 a discharge or flushing pipe, and 36 a closet vessel.

The valve acts in the following way. When it is closed, as it is shown to be in Figs. 1 and 2, there is in the chamber above the differential piston a pressure equal to the pressure in the water pipe netting, owing to the existence of the apertures 11 in the differential piston 5 and the hole 19 and the channel 17 in the valve spindle. The same pressure also prevails, owing to the occurrence of the channel 17 and the holes 18 in the valve spindle 12, in the lower hollow part of the differential piston. In virtue of the tight fit of the differential piston against the valve seat 4 and the tight fit of the valve spindle against the valve seat 10, the valve is kept closed. When the valve is to be opened, the spindle 23 is pressed inwards, as is shown in Fig. 4. The conical end 25 of the pressure spindle then lifts the valve spindle 12, so that it ceases to fit tightly against the valve seat 10, while on the other hand a tight fit between the projection 14 and the sleeve 15 ensues, and this tight fit is maintained by the pressure acting on the annular projection 14. The connection between the chamber above the differential piston and the inlet 2 through the hole 19 will then be cut off, and the water above the piston will flow through the channel 17, the holes 18 and the now open valve opening 9 to the outlet 3. The pressure above the piston is thereby diminished, and as the annular space 27 is so adjusted that sufficient pressure on the differential surface is maintained, this pressure acts in such a way as to raise the differential piston. Thereby the tightening against the valve seat 4 is interrupted, and the water flows through the adjustment or by-pass valve 28 to the main valve, through the annular space 27 and the opening at the valve seat 4 to the outlet 3. The differential piston, with the projection 14 of the valve spindle 12 pressed against the sleeve 15. continues to be raised owing to the pressure on the differential surface, so that the valve spindle impinges against the screw 22. The valve spindle is then unable to move further upwards, but the pressure on the differential surface continues to drive the different piston upwards, as the chamber above the piston is still in direct communication with the outlet 3 through the groove 20, the channel 17, the holes 18 and the valve opening 9. Consequently the valve spindle is pushed downwards in relation to the differential piston. The projection 14 is moved away from the sleeve 15, and the valve spindle will fit tight against the bottom of the differential piston at the valve seat 10, as is shown in Fig. 5. The chamber above the differential piston is then no longer in connection with the outlet 3, but on the other hand it is, through the hole 19 and the channel 17, in communication with the inlet 2. The pressure on the upper side of the differential piston rises and overcomes the pressure on the differential surface, so that the piston, according as water through the little hole 19 flows in over it, gradually sinks.

When the piston approaches the valve seat 4, the outflow area is diminished, and a pressure arises on the annular surface 8, immediately before the piston is to close the outlet. The downward motion of the piston is thereby checked, so that a shock-free closing is attained.

During the whole time in which the differential piston has moved up and down, the water has flowed direct through the valve box. Theoretical calculations and practical experiments have shown that the amount of water, which from the opening of the valve to its automatic closing flows through the valve, is independent of the pressure in the water pipe netting, and the said amount of water is determined by the dimensions of the hole 19 and the valve opening 9 and by the height to which the differential piston is raised, which height can be adjusted with the aid of the screw 22 (or of some other adjustable device). The valve is thus adjusted by means of the said screw for letting through a predetermined quantity of water. On the other hand, the time during which the said quantity of water flows through the valve is dependent on the pressure, the time being diminished as the pressure increases. If the valve is to be used as a flushing valve for water closets, a predetermined quantity of water (about 10 litres) should be let through at a certain time, which ought not to vary to any appreciable extent. If the valve then is made of such dimensions that at the minimum pressure which can occur it lets through the required quantity of water at the fixed time, it is possible by screwing down the spindle 30 in the adjustment or by-pass valve 28, so that the height to which the valve body 29 can be raised is reduced, to throttle the supply, so that the valve even at the maximum pressure in the water supply pipe will let through the required quantity of water during the fixed time.

Should it happen that back suction occurs in the water supply pipe, the valve body 29 will automatically close tightly against its seat, so that there will be no connection between the valve or the discharge pipe from it and the water supply pipe.

By tightly screwing down the adjustment spindle 30 the valve 28 will act as a shut-off cock and will shut off the water to the main valve, if the inner parts of the latter need to be inspected or repaired.

Among the many advantages which the present valve, arranged as a flushing valve for closets, possesses compared with the ordinary flushing cisterns, it may be especially pointed out that the sharp, hissing sound which arises when the flushing cisterns are filled, and which is propagated along the pipes, is eliminated by the use of the present valve.

The invention, which obviously can be applied to other cases than that indicated, can be carried out in other ways than that described and illustrated by way of example.

Having now described my invention, what I claim as new and desire to secure by Letters Patent is:

1. Self-closing and shock-preventing valve provided with a differential piston, movable in a valve box, said piston forming a valve body, which at the outlet side of the valve tightens against a seat in the valve box, when the valve is closed, and with a valve spindle, movable in the differential piston, characterized by the fact that the valve spindle, after having been acted upon from without, under the mediation of water pressure and a stopping device cooperates with the differential piston in such a manner that the valve lets through a predetermined quantity of liquid.

2. Valve according to claim 1, characterized by the fact that the stopping device in the form of a screw for the valve spindle is adjustable, whereby the quantity of water passing through the valve can be regulated.

3. Valve according to claim 1, characterized by the fact that the differential piston and the valve spindle are so arranged that, when the valve is closed, there is communication between the inlet of the valve and a variable pressure chamber limited by the differential piston, which communication, when the valve spindle at the opening of the valve is acted upon from without, is cut off and instead communication between the variable pressure chamber and the outlet of the valve is brought about via the valve spindle.

4. Valve according to claim 3, characterized by the fact that the valve spindle is provided with a projection, on which the pressure from the inlet acts in such a manner that the connection between the variable pressure chamber and the outlet during the movement, caused by the water pressure, of the differential piston and the valve spindle is maintained interrupted, until the valve spindle impinges on the stopping device.

5. Valve according to claim 1, characterized by the fact that the differential piston and the valve spindle are so arranged, that when the latter impinges on the stopping device, the connection between the inlet and the variable pressure chamber is restored, while the connection between the said chamber and the outlet is cut off.

In witness whereof I hereunto set my hand in presence of two witnesses.

ELOF KARL HJALMAR LUNDBERG.

Witnesses:
H. D. OHLSSON,
A. OHLSSON.